(12) United States Patent  
Antonakis

(10) Patent No.: US 12,393,286 B2
(45) Date of Patent: Aug. 19, 2025

(54) WRITING IMPLEMENTS

(71) Applicant: BIC Violex Single Member S.A., Anoixi (GR)

(72) Inventor: Ion-Ioannis Antonakis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 0 days.

(21) Appl. No.: 18/690,616

(22) PCT Filed: Sep. 8, 2022

(86) PCT No.: PCT/EP2022/074978
§ 371 (c)(1),
(2) Date: Mar. 8, 2024

(87) PCT Pub. No.: WO2023/036869
PCT Pub. Date: Mar. 16, 2023

(65) Prior Publication Data
US 2024/0402838 A1    Dec. 5, 2024

(30) Foreign Application Priority Data

Sep. 10, 2021    (EP) ..................................... 21196016

(51) Int. Cl.
*G06F 3/0354* (2013.01)
*B43K 29/10* (2006.01)
(Continued)

(52) U.S. Cl.
CPC .......... *G06F 3/03542* (2013.01); *B43K 29/10* (2013.01); *G02B 5/23* (2013.01); *G06F 3/03545* (2013.01); *G06F 3/0386* (2013.01)

(58) Field of Classification Search
CPC . G06F 3/03545; G06F 3/03542; G06F 3/0386
See application file for complete search history.

(56) References Cited

U.S. PATENT DOCUMENTS 6,099,185 A    8/2000  Huang et al.
6,719,473 B1   4/2004  Kao
(Continued)

FOREIGN PATENT DOCUMENTS

CN    201020999 Y      2/2008
CN    205191303 U  *  4/2016
(Continued)

OTHER PUBLICATIONS

© 2024 Kikkerland Design Inc. (n.d.). Flashlight Pen. Kikkerland. https://kikkerland.com/products/flashlight-pen.
(Continued)

*Primary Examiner* — Patrick F Marinelli
(74) *Attorney, Agent, or Firm* — Bookoff McAndrews, PLLC

(57) ABSTRACT

A writing implement configured to emit light for altering the appearance of a substrate including at least one photochromic material, wherein the writing implement includes:
an elongate body portion enabling a user to grip the writing implement, wherein the body portion comprises a proximal end and a distal end;
a first light source configured to emit light from the proximal end, wherein the emitted light comprises at least a first colour component within a first wavelength range, wherein the first wavelength range at least partially corresponds to a deactivation spectrum of a first photochromic material of the substrate; and
a controller configured to receive input from a user, and to generate signals for controlling the first light source based on the received user input.

18 Claims, 7 Drawing Sheets

(51) Int. Cl.
*G02B 5/23* (2006.01)
*G06F 3/038* (2013.01)

(56) References Cited

U.S. PATENT DOCUMENTS

| | | |
|---|---|---|
| 7,547,109 B2 | 6/2009 | Schmidt et al. |
| 2003/0112623 A1 | 6/2003 | Yu et al. |
| 2004/0076460 A1* | 4/2004 | Yu .................. B43L 1/008 401/1 |
| 2004/0161287 A1 | 8/2004 | Yu |
| 2007/0048065 A1* | 3/2007 | Schmidt .............. B43L 1/02 401/109 |
| 2007/0054590 A1* | 3/2007 | Schmidt .............. B43L 1/02 446/153 |
| 2007/0054594 A1* | 3/2007 | Schmidt .............. B43L 1/10 446/424 |
| 2007/0060013 A1* | 3/2007 | Schmidt ............ G06F 3/03542 446/175 |
| 2009/0014524 A1 | 1/2009 | Silverbrook et al. |
| 2011/0075440 A1 | 3/2011 | Wang |
| 2011/0181856 A1 | 7/2011 | Lee et al. |
| 2014/0133134 A1* | 5/2014 | Kim ............... G06F 3/03545 362/109 |
| 2014/0141689 A1 | 5/2014 | Yasuda et al. |
| 2014/0334026 A1 | 11/2014 | Gross et al. |
| 2024/0402838 A1* | 12/2024 | Antonakis ......... G06F 3/03542 |

FOREIGN PATENT DOCUMENTS

| | | |
|---|---|---|
| CN | 106678668 A | 5/2017 |
| CN | 107203286 A | 9/2017 |
| CN | 207651030 U | 7/2018 |
| CN | 209351124 U | 9/2019 |
| CN | 112208237 A | 1/2021 |
| EP | 3835077 A1 | 6/2021 |
| JP | H07314981 A | 12/1995 |
| JP | 2007176992 A | 7/2007 |
| JP | 2011003108 A | 1/2011 |
| WO | 2007020418 A1 | 2/2007 |
| WO | WO-2020097826 A1 * | 5/2020 |

OTHER PUBLICATIONS

Punpongsanon, P., et al., published at CHI 2018, Apr. 21-26, 2018, Montreal, QC, Canada. ColorMod: Recoloring 3D printed objects using photochromic inks. http://groups.csail.mit.edu/hcie/files/research-projects/colormod/2018-chi-colormod-paper.pdf.

Search Report and Written Opinion issued in International Application No. PCT/EP2022/074978, mailed Mar. 16, 2023.

Yuhua Jin, et al., published at UIST '19, Oct. 20-23, 2019, New Orleans, LA, USA. Photo-Chromeleon: Re-Programmable Multi-Color Textures Using Photochromic Dyes. https://groups.csail.mit.edu/hcie/files/research-projects/photochromeleon/2019-uist-photochromeleon-paper.pdf.

* cited by examiner

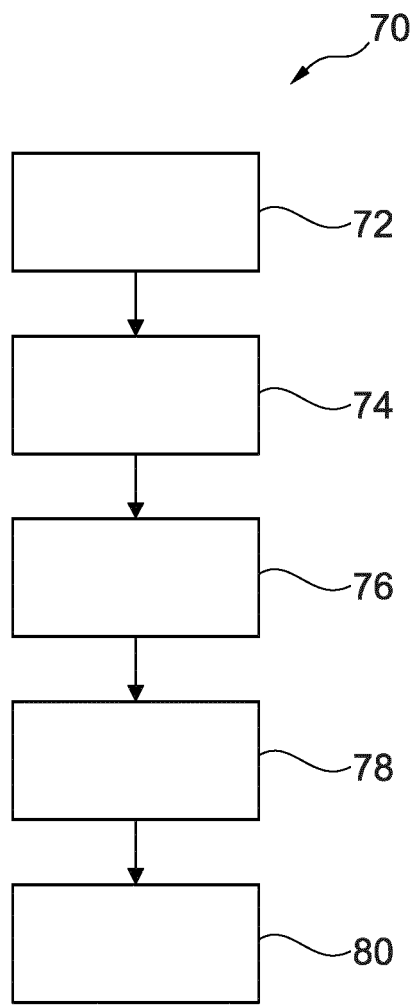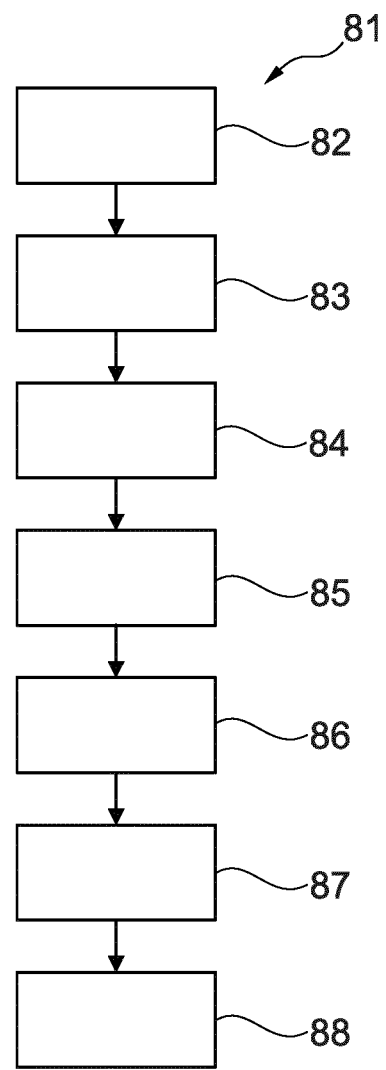

WRITING IMPLEMENTS

CROSS-REFERENCE TO RELATED APPLICATIONS

This is a National Stage Application under 35 U.S.C. § 371 of International Application No. PCT/EP2022/074978, filed Sep. 8, 2022, now published as WO 2023/036869 A1, which claims priority to European Patent Application No. 21196016.6, filed on Sep. 10, 2021, the entireties of which are incorporated herein by reference.

TECHNICAL FIELD

The embodiments described in the following disclosure relate to a writing implement configured to emit light for altering the appearance of a substrate comprising at least one photochromic material, and an associated method, photochromic writing system, computer program element, and computer readable medium.

BACKGROUND

Some options for writing or drawing on a substrate include the use of a pen and permanent ink to write on paper, the use of pencil to write on paper, or the use of a non-permanent ink to write on a whiteboard surface, for example the BIC Velleda™ whiteboard.

Erasability, or the ability of an ink formulation to be removed from a surface after it has been deposited and allowed to dry is a difficulty in the stationery category. The majority of available solutions focus on single colour writing products. Changing the colour of an inscribed surface typically requires re-scribing on the surface using a different ink colour. This slows down the user, and is a non-resettable process. Furthermore, changing the colour of the surface using incompatible inks could lead to peeling, blistering, or running of the two or more colours into each other.

Modern consumers are typically becoming more interested in personalised writing products having added functionality. Such products can be personalised to the needs of individual users. Furthermore, writing options enabling re-use of the writing media may increase in importance as environmental concerns continue to increase in prominence.

Writing instruments providing greater user flexibility and improved environmental outcomes may, therefore, be provided.

SUMMARY

According to a first aspect, there is provided a writing implement configured to emit light for altering the appearance of a substrate comprising at least one photochromic material.

The writing implement comprises an elongate body portion enabling a user to grip the writing implement, wherein the body portion comprises a proximal end and a distal end.

The writing implement further comprises a first light source configured to emit light from the proximal end, wherein the emitted light comprises at least a first colour component within a first wavelength range.

The writing implement further comprises a controller configured to receive input from a user, and to generate signals for controlling the first light source based on the received user input.

The writing implement further comprises a user-actuatable colour selector configured to receive a colour setting command from a user of the writing implement, and to provide the colour setting command to the controller.

According to this aspect, a light-emitting writing implement capable of providing a non-permanent marker capable of marking using at least one colour is provided. A user is enabled to write or draw on the substrate of a photochromic surface with one or more colours using a single light-emitting writing implement, and without depositing any ink, making a graphite mark, or requiring ink refills. This is possible because the writing medium containing the substrate is covered with at least one substance that changes its colour based on the intensity and wavelength of light that the substrate is exposed to. The light-emitting writing implement can emit one or more colours of light from its tip with a varying intensity that accordingly changes the colour of the light activated photochromic material on the writing medium.

Combinations of light source, or single light sources capable of emitting a large range of colours, combined with combinations of photochromic material on the substrate of the writing medium, enable a large gamut of colour space to be displayed to a writer. In examples, a writing system may comprise a single photochromic material and a stylus configured to emit a single colour spectrum. In this case, a similar system can be provided performs the artistic function of a monochromic ink pen.

Photochromic materials are typically resettable (erasable) by the application of radiation in a specific wavelength range, specifically UV, to portions of the substrate. Such portions appear opaque once radiation in that specific wavelength (for example, ultraviolet radiation) is applied to the substrate. This process is referred to as activating the at least one photochromic material.

A light-based actuation of the photochromic medium means that the effective nib size of the stylus may be changed by changing the focal characteristics of the at least one light source of the stylus.

According to a second aspect, there is provided a method for using a writing implement configured to emit light to alter the appearance of a substrate comprising at least one photochromic material, comprising:
  receiving, from a user-actuatable colour selector of the writing implement, a colour setting command from a user of the writing implement;
  providing the colour setting command to a controller of the writing implement;
  computing a required setting for at least a first colour component to be emitted by the first light source of the writing implement;
  controlling the first light source to emit light comprising at least the computed first colour component, wherein the first colour component is within a first wavelength range, that at least partially corresponds to a deactivation spectrum of a first photochromic material of a substrate of a proximate writing medium; and
  disposing the proximal end of the writing implement relative to the proximate writing medium to expose the substrate of the proximate writing medium comprising at least the first photochromic material to the light generated by the first light source.

According to a third aspect, there is provided a photochromic writing system comprising
  a writing implement according to the first aspect or its embodiments, and a writing medium 50 (surface) comprising a substrate treated with a photochromic material. The writing implement is configured, in use, to emit light in the visible spectrum capable of deactivating the photochromic material comprised in the substrate of the writing medium to thus change the appearance of a portion of the writing medium.

According to a fourth aspect there is provided a computer program element comprising machine-executable instructions which, when executed on a computer processor, cause the processor to perform the steps according to the method of the second aspect.

According to a fifth aspect, there is provided a computer readable medium comprising the computer program element of the fourth aspect.

In this specification and claims, the term "proximal end" means an end of a stylus that, in use, is held closest to a writing medium compared to the "distal end" of the stylus. In a case where a stylus comprises a first light source for writing on a substrate, and a second light source at an opposite end of the stylus for erasing the substrate, the convention in this specification is that the proximal end of the stylus is the end of the stylus comprising the first light source for writing on the substrate.

In this specification and claims, the term "photochromic material" (or "photochromic dye") concerns materials that make use of photochromism. Photochromism is the reversible transformation of chemical species between two forms mediated by the absorption of electromagnetic radiation. Typically, the two forms of the chemical species have different absorption spectra. To an observer, the resulting material can have the effect of providing a reversible change of colour when exposed to light. Photochromic materials can include photochromic dyes (paints or inks), photochromic films, or photochromic plastics. In other words, photochromic materials are light activated materials. To enable a photochromic material to be applied to a surface, it may in examples be mixed with an encapsulation agent such as a lacquer or a resin, for example.

In this specification, the term "writing implement" refers to, in examples, a stylus containing, at a proximal end, an optical source that can be held by a user, to produce a visible marking on a substrate of a writing medium containing at least one photochromic dye.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

FIG. 5 schematically illustrates a method according to the second aspect.

FIG. 6 schematically illustrates an example method.

DETAILED DESCRIPTION

Present writing instruments are susceptible to producing text or graphical traces that are easily smeared, owing to the relatively long ink drying time on some media. Mixing multiple ink colours when wet, in order to obtain a unique colour, can lead to unattractive smudging and uneven blending of the inks. The nib size of a conventional writing instrument is often fixed, and if a variety of nib sizes is desired by a user, then the user must purchase and store a variety of different pens. A reduction in the amount of paper waste, and the number of plastic and non-reusable products is increasingly important.

Photochromic materials can transform from a transparent state to a coloured state through the absorption of UV (ultraviolet) light. Application of UV light to a photochromic material puts the photochromic material into a so-called "activated" state, causing the photochromic material to display a colour. By absorbing visible light in a deactivation wavelength, the photochromic material is transformed back from displaying the colour to being substantially transparent (a so-called "deactivated state"). Each photochromic material (dye) has a distinct activation spectrum, wherein light applied to a portion of photochromic material falling within the activation spectrum will cause the portion of photochromic dye to activate, and become opaque. This more pronounced, or faster, the closer the wavelength of the incident light is to the peak of the activation spectrum for a given photochromic material.

It is possible to use a single photochromic material in a monocolour photochromic writing solution. However, two or more photochromic materials may be mixed together and isolated in a translucent resin or other clear material, for example, to enable a more complex colour space to be obtained, relative to a wavelength of the incident light.

Figure 1:
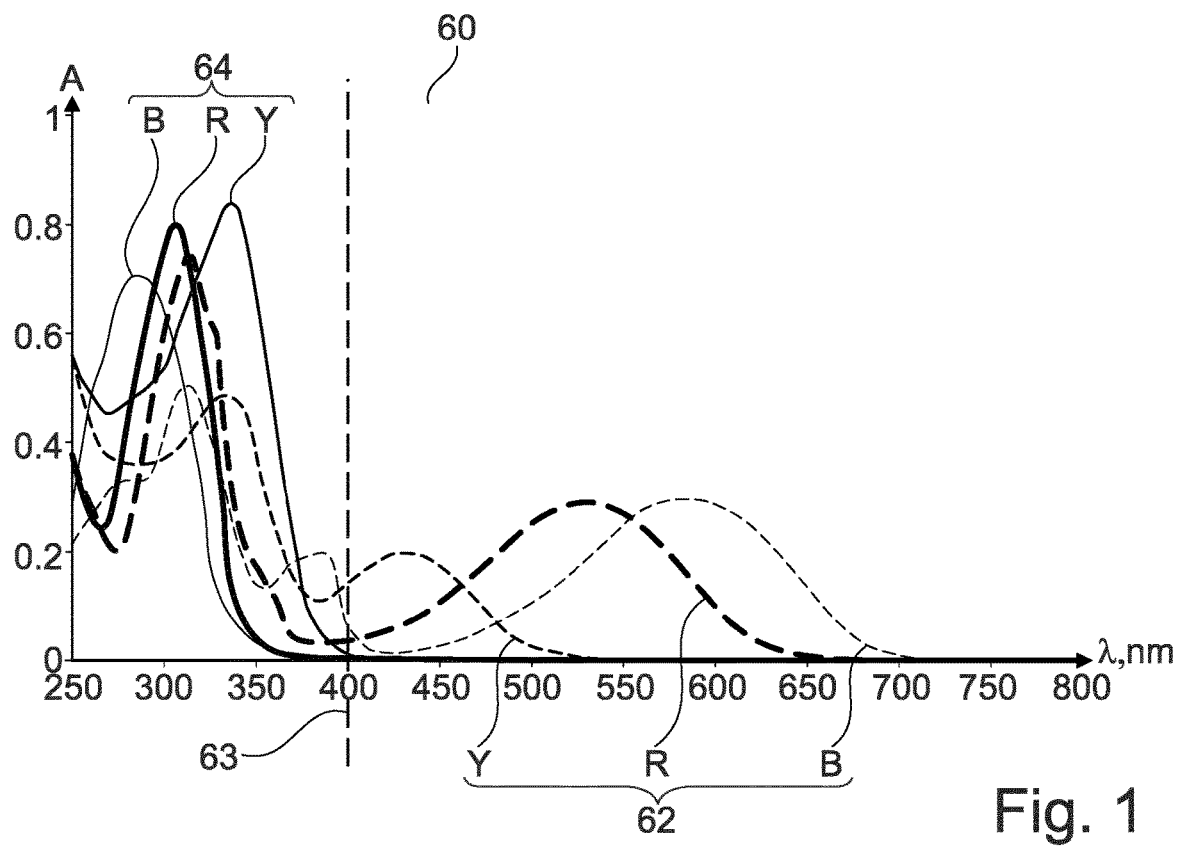
FIG. 1 illustrates a plot showing activation and deactivation spectra of three photochromic materials.

FIG. 1 illustrates a plot showing activation and deactivation spectra of three photochromic materials.

The paper "*ColorMod: Recoloring 3D Printed Objects using Photochromic Inks*" by Punpongsanon, et. al, published at CHI 2018, Apr. 21-26, 2018, Montreal, QC, Canada (ISBN 978-1-4503-5620-6/18/04 discusses photochromic inks, and activation and deactivation spectra of three photochromic materials. The paper "*Photo-Chromeleon: Re-Programmable Multi-Color Textures Using Photochromic Dyes*" by Jin, Y et. al, published at UIST '19, Oct. 20-23, 2019, New Orleans, LA, USA, (ISBN N 978-1-4503-6816-2/19/10) discusses a different arrangement of dyes.

FIG. 1 is based on a chart available from Yamada Chemical Co., Ltd, of Kyoto, Japan (http://ymdchem.com) and discussed in the above papers. For example, FIG. 1 displays activation and deactivation spectra for DAE-0001 (blue), DAE-0004 (red), and DAE-0068 (yellow) available from Yamada Chemical Co., Ltd.

In FIG. 1, the x-axis indicates wavelength of incident electromagnetic radiation used for activation or deactivation of a photochromic material. The y-axis indicates the normalized absorption of a given photochromic material at that wavelength.

In particular, dotted line 62Y is the deactivation spectrum for the yellow photochromic material DAE-0068 (in the following, "yellow"), dotted line 62R is the deactivation spectrum for the red photochromic material DAE-0004 (in the following, "red"), and dotted line 62B is the deactivation spectrum for the blue photochromic material DAE-0001 (in the following, "blue"). Furthermore, solid line 64B is the peak of the activation spectrum for the blue photochromic material, solid line 64R is the peak of the activation spectrum for the red photochromic material, and 64Y is the peak of the activation spectrum for the yellow photochromic material.

Boundary line 63 shows the approximate transition between ultraviolet (UV) and visible light wavelengths. Therefore, DAE-0001 (blue) has an activation peak at approximately 270 nm and a deactivation peak at approximately 580 nm, DAE-0004 (red) has an activation peak at approximately 310 nm and a deactivation peak at approximately 225 nm, and DAE-0068 (yellow) has an activation peak at approximately 350 nm and a deactivation peak at approximately 425 nm. The combination of the three identified photochromic dyes in FIG. 1 provides an RGB colour space, but is for exemplary purposes, and is not essential. For example, two or one photochromic materials could be utilized. More than three photochromic materials could be utilized.

For example, another exemplary colour combination is Yamada DAE-0001 (blue), DAE-0012 (magenta), and DAE-0068 (yellow) to obtain a CMY colour space. DAE-0012 has a deactivation peak at 530 nm. When all components of a CMY photochromic material mixture are activated, a black writing surface results.

Figure 2:
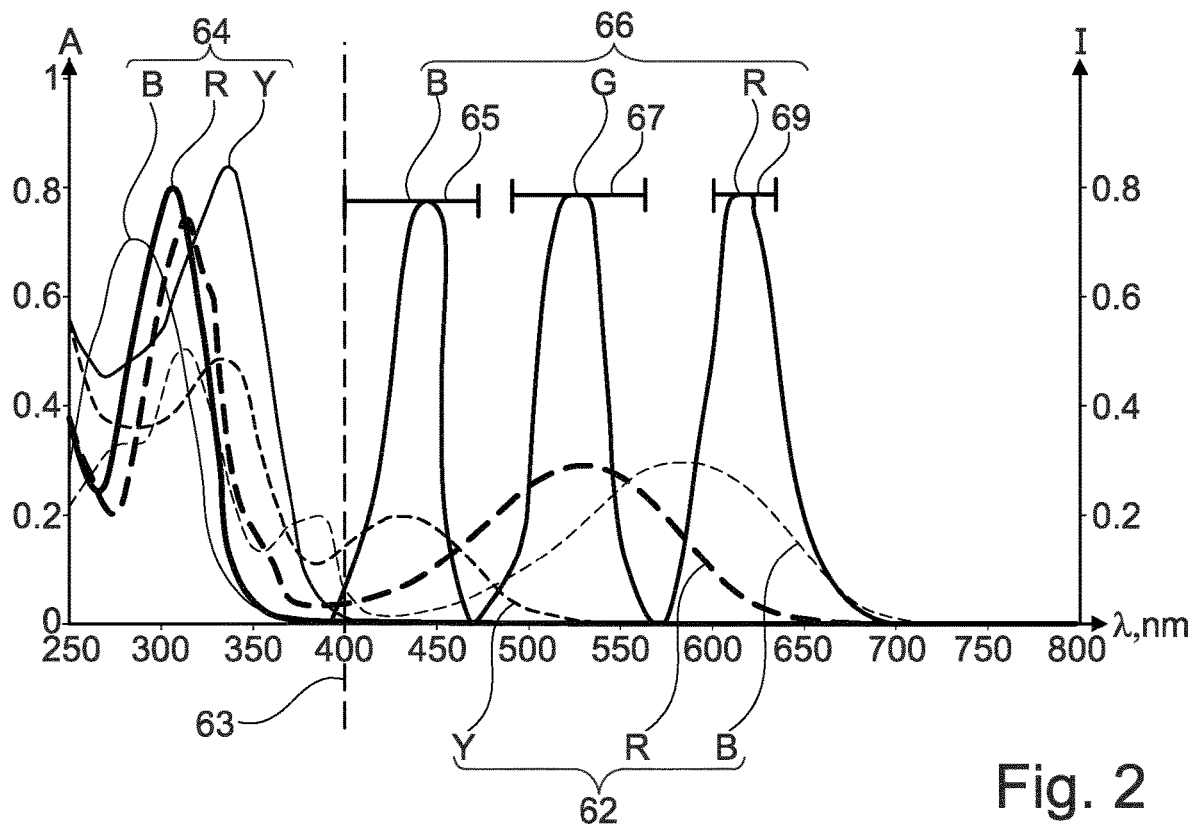
FIG. 2 illustrates a plot showing three light source spectra superimposed over activation and deactivation spectra of three photochromic materials.

FIG. 2 illustrates a plot showing three light source spectra for deactivating respective blue, green, and red photochromic materials superimposed over activation and deactivation spectra of three photochromic materials in the first example of a combination of DAE-0001, DAE-0004, and DAE-0068. The "I" axis on the right-hand side of this plot is an exemplary scale of normalized intensity of a blue, green, or red light source, respectively. The red light source spectrum has a spectral peak 66R at approximately 620 nm. The green light source spectrum has a spectral peak 66G at approximately 525 nm. The blue light source spectrum has a spectral peak 66B at approximately 440 nm.

These wavelength ranges are exemplary, and other light sources with different wavelengths and/or different spectral linewidths could be used to deactivate the red, blue, or yellow photochromic materials in the example of FIG. 1. Deactivation will be most effective, and more rapid, when the peak deactivation wavelength of a given light source is aligned with the deactivation peak of a corresponding dye. The linewidth of each of the blue 66B, green 66G, and red 66R sources is illustrated by wavelength ranges 65, 67, and 69, respectively. For example, wavelength ranges 65, 67, and 69 may be defined by the 3 dB drop-off point of the respective linewidth.

Depending on the combination of photochromic materials used, the light source linewidths may be chosen to deactivate the target dye to the greatest extent, whilst affecting the adjacent dye deactivation spectra as little as possible. However, linewidth requirements of the optical sources may be relaxed using several techniques. For example, the light sources may be applied to the substrate 52 in a rapidly repeating time sequence designed to minimize leakage between colour channels. The colour space may be restricted to colour options that do not lead to spectral mixing between the available photochromic materials and light sources.

Coloured photochromic dyes of base colours (for example, CMY) may be mixed together, and isolated in a resin or lacquer. This provides a photochromic paint formulation for application to a writing medium, such as a whiteboard or hand-held tablet (although in a basic option, only one photochromic material needs to be used). In an example with two or more photochromic materials, the paint formulation has the ability to change colour on demand, by deactivating each photochromic material individually.

In an example using a CMY colour space (via, for example, a paint formulation comprising DAE-0001, DAE-0004, and DAE-0068), the paint formulation is, firstly, activated (by exposure to UV light). As a result, the colours would all be fully saturated (in the example of a CMY colour selection, the paint formulation would appear to be black). If a user desires to paint with a yellow colour, the C and M dyes should be deactivated. Deactivation could be achieved by, in this example, exposing the paint formulation to light at 580 nm (Cyan) and 530 nm (Magenta) for a predetermined amount of time. Once the C and M dyes have been deactivated, the paint formulation appears to be yellow.

The paint formulation can be reset by exposure resaturate all of the dyes by exposure to UV light having a wavelength of 365 nm, for example. In an example, this resetting process involves a 30 second exposure of the paint formulation to UV light having an approximate power output of 5 mW per square centimetre, for example. Power-efficient UV Light Emitting Diodes (LEDs) capable of emitting light at a wavelength of 365 nm are available, as well as LEDs capable of emitting RGB colours, for example.

According to a first aspect, there is provided a writing implement 10 configured to emit light for altering the appearance of a substrate 52 comprising at least one photochromic material. The writing implement comprises an elongate body portion 12 enabling a user to grip the writing implement, wherein the body portion comprises a proximal end P and a distal end D. The writing implement further comprises a first light source 16 configured to emit light from the proximal end, wherein the emitted light comprises at least a first colour component within a first wavelength range 65. The first wavelength range at least partially corresponds to a deactivation spectrum of a first photochromic material 62Y of the substrate (52). The writing implement also comprises a controller 18 configured to receive input from a user, and to generate signals for controlling the first light source based on the received user input.

Figure 3A:
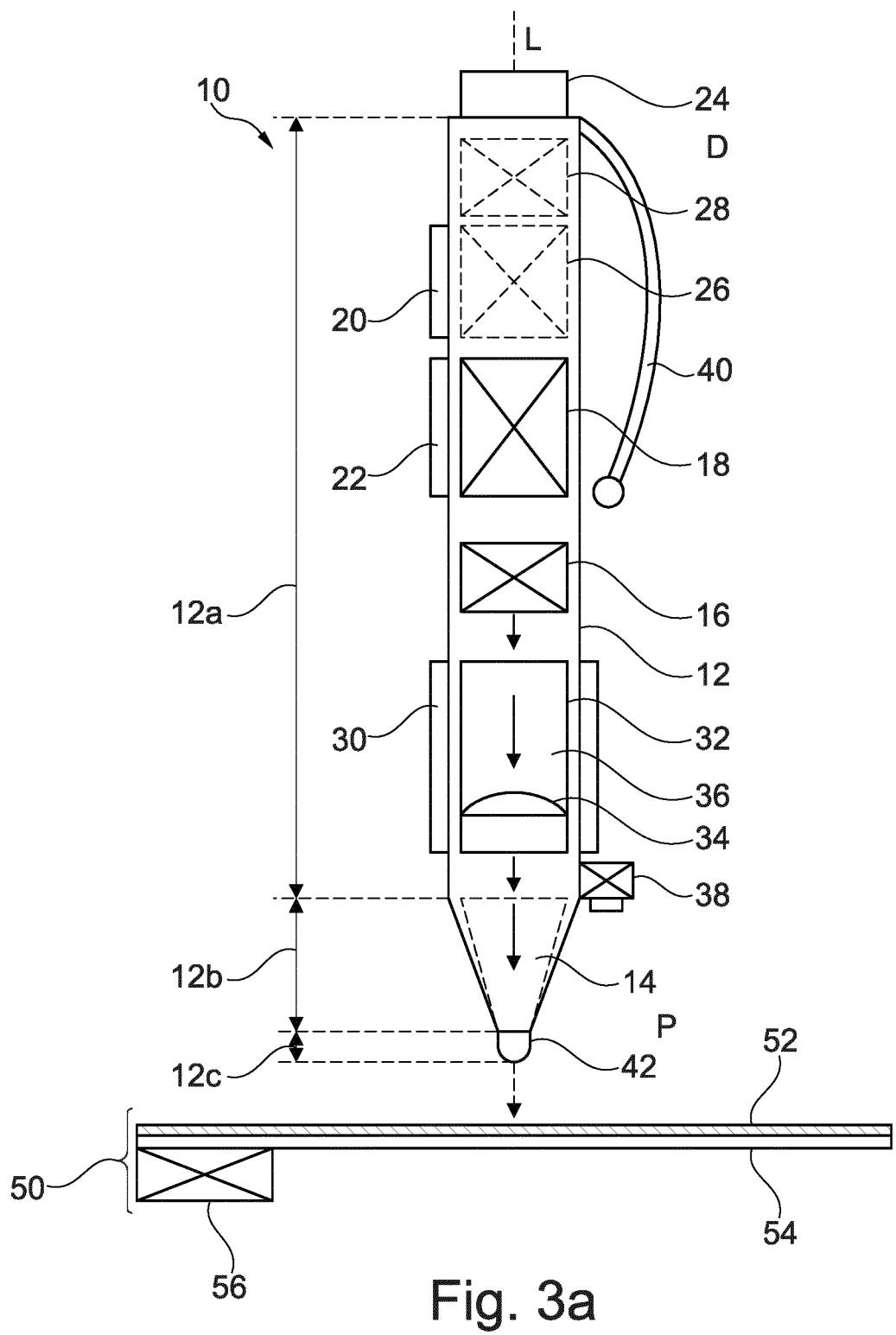
FIG. 3a schematically illustrates a writing implement according to the first aspect and a photochromic writing system according to the third aspect.

FIG. 3a schematically illustrates a writing implement 10 according to the first aspect and a photochromic writing system according to the third aspect.

For example, the writing implement 10 (or light pen, or light-emitting stylus) of FIG. 3a is an elongated object capable of being held in the hands of an adult or child, for example. The writing implement 10 has a proximal end P suitable for orienting at a writing medium 50 during deactivation, and a distal end D. In an example, the writing implement 10 has a circular, ovular, square, rectangular, pentagonal, hexagonal, or heptagonal cross-section along at least a segment. The writing implement 10 is, for example, illustrated as an elongated object aligned along a longitudinal axis L, but this is not essential. For example, the writing implement 10 may comprise a flexible segment (not illustrated) that can be realigned from the longitudinal axis L, with light from the first light source 16 being transferred via optical fibre along a portion of the writing implement, for example.

The form-factor of the elongate body 12 may change along the longitudinal axis L of the writing implement 10 to accommodate ergonomic variations or to enhance user comfort, for example (not illustrated). In the illustrated example, the writing implement 10 comprises a main body portion 12a, a tapering body portion 12b, and an optical nib portion 12c.

To contextualize the writing implement 10, the writing medium 50 (with which the writing implement is intended to be used) may be considered to be, for example, a substantially planar rigid backing layer 54, upon which is provided a photochromic substrate layer 52. The photochromic substrate layer 52 may comprise one, or more photochromic materials (dyes) selected to provide a colour space of interest. It is not essential that the writing medium 50 is substantially planar, and the writing medium may be a physical object such as a carton, 3D-printed object, laptop casing, a whiteboard, or many other objects.

For example, the photochromic substrate layer 52 may comprise a mixture of Yamada DAE-0001 (blue), DAE-0012 (magenta), and DAE-0068 (yellow) to obtain a CMY colour space. In another example, photochromic substrate layer 52 comprise a mixture of Yamada DAE-0001 (blue), DAE-0004 (red), and DAE-0068 (yellow) available from Yamada Chemical Co., Ltd. A skilled person will appreciate that a wide range of photochromic materials may be applied, dependent on the intended end colour specification.

In examples, one photochromic material may be applied to the substrate 52. In an example, the one or more photochromic dyes is mixed into a composition comprising a curable lacquer, enabling permanent application of the one or more photochromic dyes to the substrate 52.

Although not essential, the writing medium 50 may comprise an electronic subsystem 56 comprising a second modem and memory. As will be explained, the electronic subsystem enables the writing implement 10 to obtain colour space data (such as the type of photochromic material used in a given writing medium 50) from the writing medium 50. In examples, the writing implement 10 may carry a lookup table of target writing media 50, with an identifier of the writing medium selectable via a control of the writing implement 10, or a smartphone application. This enables the writing medium 50 to be simplified and not to require a second modem and memory, for example.

In an example, the total length of the writing implement 10 in the longitudinal direction L is between 50 mm and 200 mm, and specifically 140 mm. In an example, when the writing implement 10 has a circular cross-section, the maximum diameter of the writing implement is in the range of 6 mm to 20 mm, and specifically 9 mm. The elongate body of the writing implement 10 may, for example, comprise injection moulded from polystyrene or polypropylene.

In the illustrated example, the external surface of the writing implement 10 comprises, near to its distal end, a clip 40 for facilitating attachment to a user's pocket, for example. The writing implement 10 comprises, near to the proximal end, a user grip 30 comprised of a resilient material such as rubber. The user grip 30 may be moulded to achieve an ergonomic match with a typical user profile, to enhance writing comfort.

The elongate body portion 12 of the illustrated writing implement 10 encloses a first light source 16 (a deactivation light source for at least one photochromic material), a focussing element 32, and an optical coupler 14 having a protruding optical nib portion 42. The first light source 16 is configured to generate deactivation light for deactivating a photochromic dye. In the illustrated example, the aforementioned elements are aligned along the longitudinal axis L so that deactivation light is transmitted from the first light source 16, via the focussing element 32 and the optical coupler 14, and out of the protruding nib optical nib portion 42, such that a separate photochromic substrate layer 52 of a separate writing medium 50 is deactivated using light having the wavelength, or wavelengths, supplied by the first light source 16. In another example, the first light source does not need to be aligned along the longitudinal axis L with other elements within the elongate body 12. Optical radiation from the first light source 16 may be distributed using a light-pipe or optical fibre, for example.

A user-actuatable colour selector is configured to receive a colour setting command from a user of the writing implement 10, and to provide the colour setting command to the controller.

The writing implement 10 comprises a colour selector 20, and a beam size selector 22, to be discussed subsequently in more detail. The colour selector 20, and the beam size selector 22 are accessible on an external surface of the elongate body portion 12, for example. The colour selector 20, and a beam size selector 22 are configured to provide input signals to the controller 18. The controller 18, the first light source 16, and the focussing element 32, receive electrical energy from a power source 26.

In an embodiment, the controller 18 is configured to perform one or more of the following functions: to execute a colour setting computation of the first light source 16; to drive the display of the colour selection system; to control the first and/or second light emitting sources; to accept input from the beam size selector 22 and to accordingly control the focussing element 32; and to monitor and control the power source 26, and/or the first modem 28. The controller may be, for example, a microprocessor or a microcontroller.

Figure 3B:
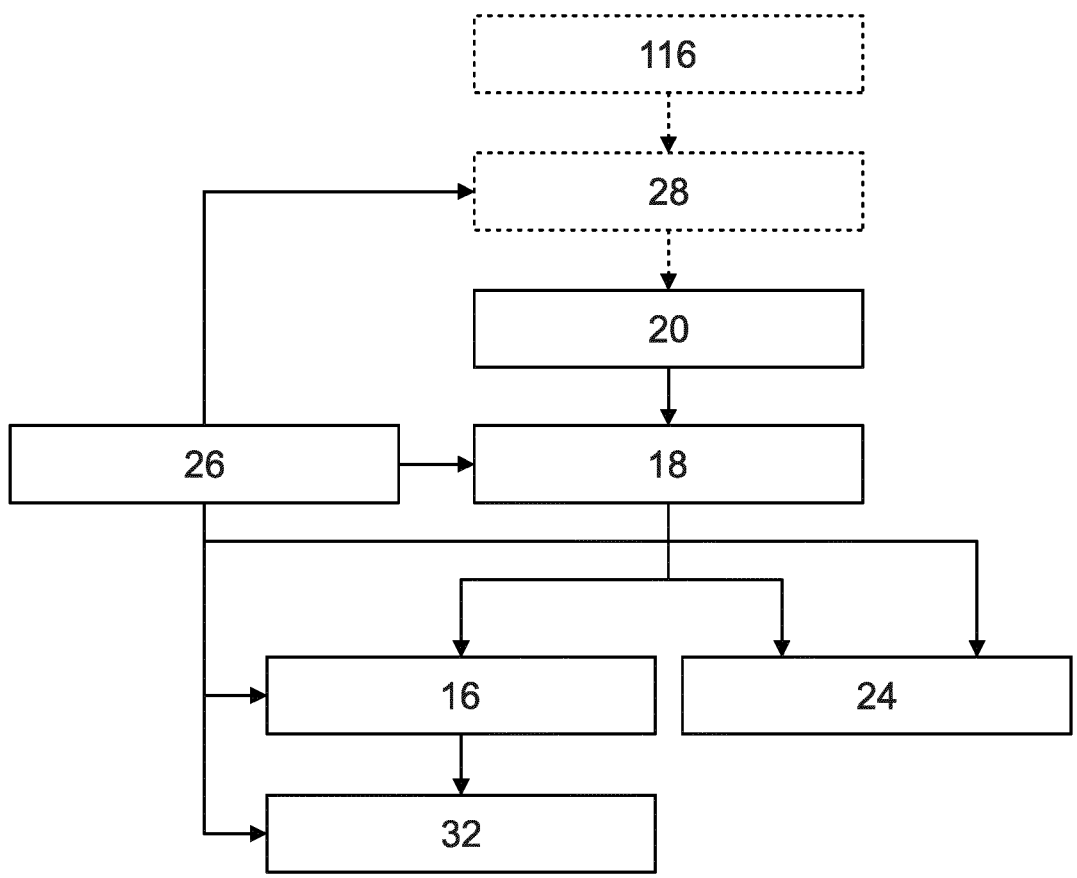
FIG. 3b schematically illustrates a functional relationship of elements of a writing implement according to the first aspect.

FIG. 3b schematically illustrates a functional relationship of elements of a writing implement 10 according to the first aspect.

In an embodiment, the colour selector 20 comprises a fixed selection of pre-set buttons for selecting the available colour options. In an embodiment, the colour selector 20 may be a rotating wheel or sliding selector on the elongate body portion 12 enabling selection of a predefined colour by moving the selector by a predefined displacement.

In an example, the writing implement 10 may comprise a display (not illustrated) connected to the controller 18. The display may be configured to illustrate to a user the selected, or available, colour and/or nib size settings. In an example, the display may comprise one or a colour LCD, a colour OLED, a polychromatic LED, or a thin film transistor display, for example. In examples, the display may be a plurality of stand-alone LEDs displayed around or along the elongate body 12, for example, indicating discrete colour options.

In an example, the power source 26 may be a rechargeable "AA" battery, or one of many alternatives. The power source may comprise a wired or wireless charging system, for example.

The writing implement 10 may, in an example, comprise a second light source 24 (capable of activating at least one photochromic dye). The writing implement 10 may, in an example, comprise a third light source 24 (capable of activating at least one photochromic dye). In the illustrated example, the second light source is provided at the distal end D of the writing implement 10, intuitively in place of the eraser of a conventional pencil. The second light source 24 may be an ultraviolet light source capable of activating at least one photochromic material. Specifically, the second light source 26 may be configured to emit light having a spectral peak of 365 nm.

The writing implement 10 may comprise a camera 38 for providing feedback to the controller 18 of a colour of a substrate 52 obtained whilst operating the writing implement 10 in combination with a specific combination of photochromic materials. This embodiment will be described subsequently.

The writing implement 10 may comprise a first model 28 capable of transmitting data from the controller 18 to another modem, and capable of receiving data from another modem 18 and providing it to the controller 18. Applications of providing the writing implement 1ß with data connectivity will be discussed subsequently.

In operation, a user obtains a writing medium 50 comprising a substrate 52 containing at least one photochromic material. In a usual starting condition, the at least one photochromic material comprised in the substrate 52 is in a substantially or fully activated state, such that the substrate appears to a user as being saturated. In an example where the substrate 52 comprises a mixture of CMY photochromic materials, the substrate 52 appears to be substantially black. The user turns on the stylus 10 and selects a colour and/or intensity via the colour selector 20. The controller 18 receives the colour and/or intensity input signal provided from the colour selector 20. A lookup table, or an algorithm, is used to calculate the intensity of at least one component light source comprised in the first light source 16. The at least one component light source of the first light source 16 is then activated at the intensity calculated, or obtained, by the controller 18.

In an example, the user may select a beam size using the beam size selector 22 (operably coupled to the focussing element 32). The use then holds the stylus 10 so that the proximate end P of the stylus 10 is close enough to the substrate 52 of the writing medium 50 that the at least one photochromic material comprised in the substrate 52 is deactivated. The user may draw a simple or complicated pattern, or write down desired information on the substrate 52. In an example, the user may adjust one or more of the colour and/or intensity via the colour selector 20, and/or the beam size using the beam size selector 22. After the writing or drawing session using the writing medium 50 has been completed, the user can erase what has been written on the substrate 52 using, for example, ultraviolet light to activate the traces provided on the substrate 52.

According to an embodiment, the first light source 16 of the writing implement is additionally configured to emit light comprising a second colour component within a second wavelength range 67, wherein the second wavelength range at least partially corresponds to a deactivation spectrum of a second photochromic material 62R of the substrate 52, and wherein the first and second colour components are capable of being emitted from the first light source (i) individually, (ii) simultaneously, or (iii) in a predefined alternating sequence.

The first colour component is defined by optical radiation having a first wavelength range with a spectral maximum within one of the ranges: 400 nm-425 nm, 425 nm-475 nm, 475 nm-525 nm, 525 nm-560 nm, 560 nm-590 nm, 590 nm-625 nm, or 625 nm-700 nm.

According to an embodiment, the second colour component is defined by optical radiation having a second wavelength range with a spectral maximum within one of the ranges: 400 nm-425 nm, 425 nm-475 nm, 475 nm-525 nm, 525 nm-560 nm, 560 nm-590 nm, 590 nm-625 nm, or 625 nm-700 nm.

In examples, the first wavelength range is 400 nm-425 nm, and the second wavelength range is 425 nm-475 nm. The first wavelength range is 400 nm-425 nm, and the second wavelength range is 475 nm-525 nm. The first wavelength range is 400 nm-425 nm, and the second wavelength range is 525 nm-560 m. The first wavelength range is 400 nm-425 nm, and the second wavelength range is 560 nm-590 nm. The first wavelength range is 400 nm-425 nm, and the second wavelength range is 590 nm-625 nm. The first wavelength range is 400 nm-425 nm, and the second wavelength range is 625 nm-700 nm.

In examples, the first wavelength range is 425 nm-475 nm, and the second wavelength range is 475 nm-525 nm. The first wavelength range is 425 nm-475 nm, and the second wavelength range is 525 nm-560 nm. The first wavelength range is 425 nm-475 nm, and the second wavelength range is 590 nm-625 nm. The first wavelength range is 425 nm-475 nm, and the second wavelength range is 526 nm-700 nm.

In examples, the first wavelength range is 475 nm-525 nm and the second wavelength range is 525 nm-560 nm. The first wavelength range is 475 nm-525 nm, and the second wavelength range is 560 nm-590 nm. The first wavelength range is 475 nm-525 nm, and the second wavelength range is 590 nm-625 nm. The first wavelength range is 475 nm-525 nm, and the second wavelength range is 625 nm-700 nm.

In examples, the first wavelength range is 525 nm-560 nm and the second wavelength range is 560 nm-590 nm. The first wavelength range is 525 nm-560 nm and the second wavelength range is 590 nm-625 nm. The first wavelength range is 525 nm-560 nm and the second wavelength range is 625 nm-700 nm.

In examples, the first wavelength range is 560 nm-590 nm and the second wavelength range is 590 nm-625 nm. The first wavelength range is 560 nm-590 nm and the second wavelength range is 625 nm-700 nm.

In examples, the first wavelength range is 590 nm-625 nm and the second wavelength range is 625 nm-700 nm.

According to an embodiment, the light emitted by the first light source further comprises a third colour component having a spectral maximum within a third wavelength range. In examples, the third wavelength range is selected to comprise a maximum within one of the ranges 400 nm-425 nm, 425 nm-475 nm, 475 nm-525 nm, 525 nm-560 nm, 560 nm-590 nm, 590 nm-625 nm, and 625 nm-700 nm.

The first light source 16 may, in examples, be configured to output light consisting of one colour component within a first wavelength range 65. Such provision may be appropriate for a substrate 52 comprising one photochromic material.

According to an embodiment, the first light source 16 is selected from the group of: a light emitting diode configured to emit light in at least the first wavelength range, an adjustable variable colour LED, one or more laser light sources, or one or more polychromatic LEDs comprising corresponding filtering elements in at least the first wavelength range.

For example, the first light source may comprise a single multi-coloured LED configured to emit one, two, or three colours, for example RGB. The first light source may comprise a single multi-coloured LED configured to emit a range of colours in an adjustable colour gamut. The first light source is configured to emit light having a spectral maximum in at least two of the following ranges: 400 nm-425 nm, 425 nm-475 nm, 475 nm-525 nm, 525 nm-560 nm, 560 nm-590 nm, 590 nm-625 nm, and 625 nm-700 nm. In an example, the first light source may also be configured to generate UV, or specifically UV-A light, to enable the proximal end of the writing implement to activate detailed portions of substrate 52 and thus to act as a fine eraser.

According to an embodiment, the controller 18 is configured to receive the colour setting command from the user-actuatable colour selector 20, to compute a required intensity setting of at least the first colour component of the first light source enabling a desired colour to be displayed on a substrate 52 comprising at least one photochromic material, and to control the first light source 16 to emit light comprising at least the computed first colour component at the computed intensity. In an example, the controller 18 is configured to compute a required intensity of a second and/or third colour component to be emitted by the first light source.

Figure 4:
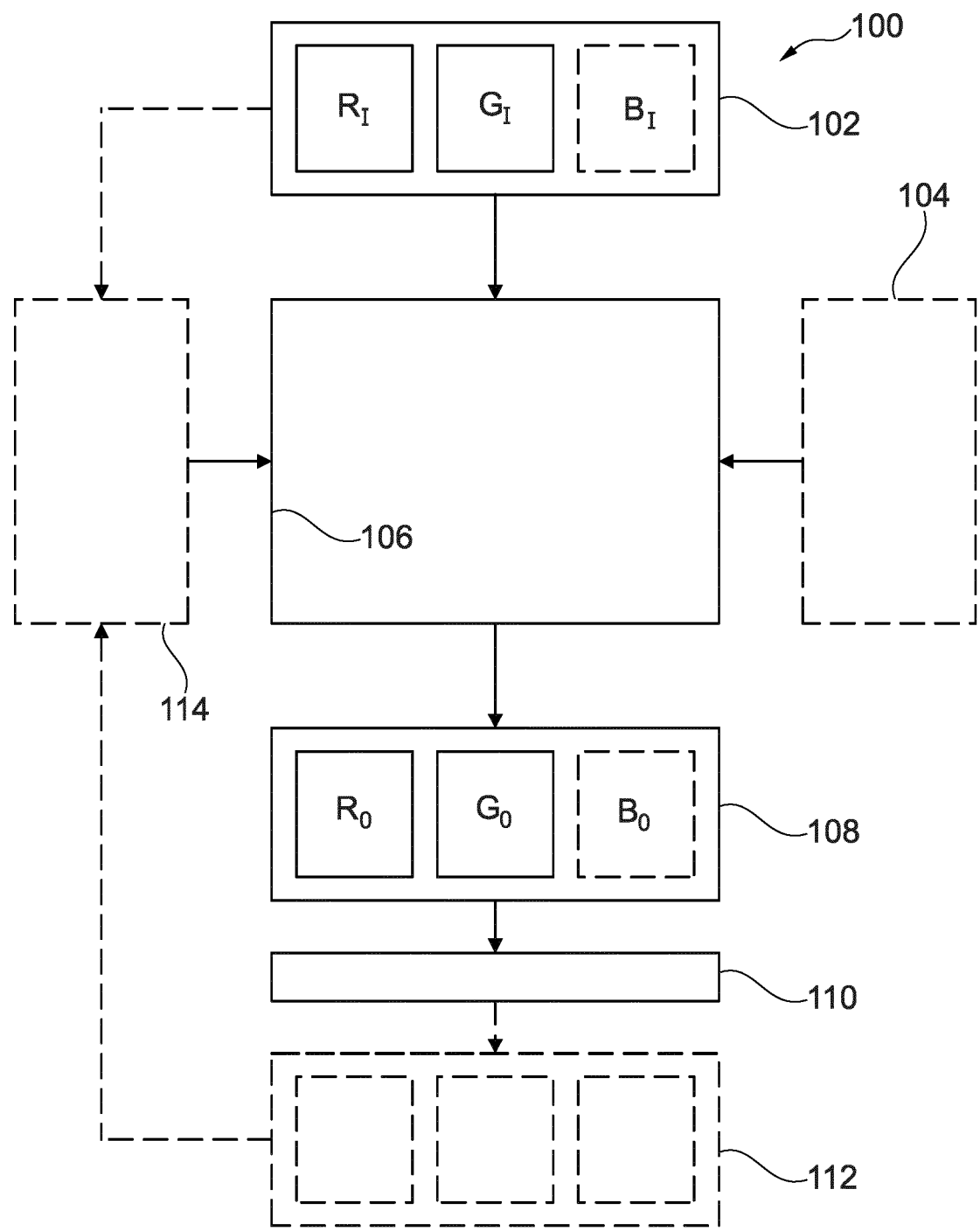
FIG. 4 schematically illustrates an example of a computer executable algorithm for setting the intensity of a light source.

FIG. 4 schematically illustrates an example of a computer executable algorithm for setting the intensity of a light source, in the form of computer-executable colour control instructions 100.

The exemplary computer-implemented algorithm for controlling the first light source 16 may be executed by the controller 18. In examples, the input colour setting 102 may be transmitted via the first modem 28 of the writing implement 10 to an external processing means, such as a smartphone executing a smartphone or digital tablet application linked to the writing implement 10, for example. In this case, the external processing means may compute output intensity values and/or sequence information of colours of the first light source 108, and transmit them back to the controller 18 of the writing implement 10 for implementation on the writing implement 10. This latter technique is applicable when the controller 18 comprised in the writing implement does not have appropriate computational resources in view of the colour selection algorithm required.

In an example, input colour setting 102 is received, for example from the colour selector 20 of the writing implement 10. A colour setting computation 106 comprises receiving one of a plurality of quantized selections from a colour space, such as the RGB colour space. The colour setting computation 106 may comprise interrogating a lookup table using the input colour setting 102. The lookup table comprises pre-computed values mapping the input colour setting 102 to output 108 intensity values and/or intensity sequence information of the first light source 16. The controller 18 sets 110 the first light source 16 based on the output intensity values and/or sequence information 108. The first light source 16 emits one or more wavelengths or spectra at one or more appropriate photochromic material deactivation colours, to achieve the desired input colour setting 102, or a colour as close to it as possible.

In an example, the input colour setting 102 may comprise one colour setting, corresponding to a first colour desired to be displayed on a substrate 52 of a writing medium 50. In this case, the output intensity values and/or sequence information 108 comprise output intensity values and/or sequence information of the first colour component within the first wavelength range. This corresponds to a use case with a writing medium 50 having one photochromic dye, or to a use case with a writing medium 50 comprising a plurality of photochromic dyes that are intended to be deactivated only by the first colour component. In an example, the colour component may be considered to be defined by the wavelength of the spectral maximum of a spectrum of a light source.

In an example, the input colour setting 102 may comprise two colour settings, corresponding to a mixture of the first and second colour coordinates in a limited colour space desired to be displayed on a substrate 52 of a writing medium 50. In this case, the output intensity values and/or sequence information 108 comprises at least two output intensity values and/or sequence information of the first colour component within the first wavelength range and a second colour component within the second wavelength range. This corresponds to a use case with a writing medium 50 having two or more photochromic dyes, or to a use case with a writing medium 50 comprising a plurality of photochromic dyes that are intended to be deactivated by the first and second colour components.

In an example, the input colour setting 102 may comprise three or more colour settings, corresponding to a mixture of first, second, and third colour coordinates in a colour space (such as RGB, CMY, and the like) desired to be displayed on a substrate 52 of a writing medium 50. In this case, the output intensity values and/or sequence information 108 comprises at least three output intensity values and/or sequence information of the first colour component within the first wavelength range, a second colour component within the second wavelength range, and a third colour component within a third wavelength range. This corresponds to a use case with a writing medium 50 having two or more photochromic dyes, or to a use case with a writing medium 50 comprising a plurality of photochromic dyes that are intended to be deactivated by at least the first, second, and third colour components.

In an example, writing medium parameters 104 are provided as part of the colour setting computation 106. For example, a smartphone application configured to perform the colour setting computation 106, and/or the controller 18 configured to perform the colour setting computation 106, may be furnished with writing medium parameters 104.

In a practical example, the writing medium 50 comprises an electronics subsystem 56 comprising at least a second modem and memory, for example. The memory stores parameters relating to the photochromic materials comprised in the substrate 52 of the writing medium 50, or at least the deactivation spectra of those materials. Thus, the writing implement 10 and/or a connected smartphone or tablet application may download information detailing the photochromic materials comprised in the substrate 52 of the writing medium 50 in a wired, or wireless data transmission, such as a Bluetooth™, Wi-Fi™, ZigBee™ or NFC communication.

In examples, a user may identify the type of writing medium used by entering a code into a smartphone or tablet application, and thus by implication identify the photochromic materials comprised in the substrate 52 of the writing medium 50. If the colour setting computation 106 has a priori knowledge of the photochromic materials comprised in the substrate 52 of the writing medium 50, a more accurate set of output intensity values of the first light source 16 may be computed.

In an example, the input colour setting 102 is received via a smartphone or tablet application.

In an example, the colour setting computation comprises a computation of a mapping in a colour gamut (colour space) between the input colour setting and the output intensity values and/or the sequence information of the first light source 106.

In an embodiment, the first light source 16 is configured to emit output at least the first and second colour components polychromatically, in other words, simultaneously, and in a steady state.

In other words, the colour setting computation 106 responsible for generating, using the first light source, the appropriate combination, or sequence, of light that results in the desired colour (chosen by the colour selector 20) on the substrate 52 of the writing medium 50. The input of the algorithm is, for example, the output of a colour selector 20, or its analogous implementation in a smartphone or tablet implementation. For example, if a user desires to write in the colour red, the blue and green channels may need to be deactivated from a saturated substrate 52. Thus, the output of the colour setting computation 106 is a signal defining the intensity per colour channel. Thus, the R channel may be set to 0% Hue, 0% intensity; the G channel to 100% Hue, 100% intensity, and the blue channel to 100% Hue, 100% intensity.

In another embodiment, the first light source 16 is configured to emit the first colour component in a first time interval, and to emit the second colour component in a second time interval that does not overlap with the first time interval.

In this embodiment, when first and second photochromic materials are mixed in the same area of a substrate 52, the deactivation of the first photochromic material may also partially deactivate the second photochromic material. Thus, a greater portion of the available colour gamut may be achievable if a first colour component is applied to the substrate in isolation to a second colour component. For given combinations of photochromic materials, experiments may enable an exposure sequence to be generated for a given set of input colour settings that achieves tolerable performance within the intended colour space, for example. Computation of whether to expose the first or second colour components first, and for how long, may be experimentally derived, or may be computed a priori using an optimization algorithm such as gradient descent, for example. In an example, the first time interval has a duration in the range 10 ms to 1 s. In an example, the second time interval has a duration in the range 10 ms to 1 s.

In another embodiment, following setting the first light source 110 using the computed output intensity values or sequence information 118, an element such as the writing implement 10, a smartphone comprising a camera (not illustrated), or another feedback element may observe the colour and intensity of the trace as it eventually appears on the substrate 52 of the writing medium 50.

FIG. 3a illustrates an example using a camera 38 for this purpose, for example. The camera may be a CMOS or CCD camera with appropriate optics, provided in a protrusion from the elongate body portion 12 enabling a field of view over the substrate 52. The optical camera 38 enables monitoring 112 of the colour of the substrate to thus provide colour feedback data. A divergence between an intended colour output at a given setting of the colour selector 20, and a resultant colour of the substrate 52, may be detected. The colour setting computation is, in an embodiment, configured to detect the divergence, and to recompute the output intensity values and/or sequence information of the first light source 16 to express the intended output colour more accurately on the substrate 52.

In an embodiment, a writing medium 50 and associated writing implement 10 may be configured to undergo a calibration sequence performed by a user. An example of a calibration sequence is that the first light source will be set to emit light having a first wavelength at a known intensity. Via a smartphone application, tablet computer, or PC, the user is instructed to draw a shape on the substrate 52. An image of the shape is captured. The image may be captured using a camera 38 integral to the writing implement 10, or by a smartphone camera, for example. The image may be captured to include an image of a related "swatch" of a test booklet next to the shape drawn on the substrate 52. A deviation between the brightness and/or hue of the expected image on the substrate 52, versus, for example, the image on the "swatch" or test booklet, is used to compute a correction factor. This calibration process may be repeated for all primary colours, for example. In examples, the calibration can be performed for arbitrary colour selections. According to the foregoing calibration method, it is not necessary for the writing medium 50 to contain electronics capable of transmitting data defining the photochromic composition of the substrate 52, because the calibration can be performed from the test swatch or test booklet. This enables different photochromic materials from different photochromic material manufacturers to be matched more carefully.

According to an embodiment, an optical coupler is provided between the first light source 16 and the proximal end P of the writing implement 10. The optical coupler functions to guide light emitted by the first light source 16 to the proximal end P where the light is emitted onto the writing medium.

In an example, the optical coupler 14 is a transparent structure that guides electromagnetic waves in the optical spectrum from the first light source to the proximal end P. The optical coupler 14 may be an optical fibre or a transparent dielectric waveguide of plastic or glass, for example. The optical coupler 14 may be a light pipe. The end of the optical coupler 14 disposed at the proximal end P of the writing implement may be integrally formed to comprise a static focussing element.

In an example, the optical coupler 14 and/or the protruding optical nib portion may be omitted, so that the path of transmission of the light beam from the first light source to the substrate 52 is via free space.

According to an embodiment, the writing implement 10 further comprises a focussing element 32 configured to adjust an extent of an illuminated region on a surface of a facing substrate by adjusting the beam size from the first and/or second light sources.

FIG. 3a schematically illustrates an example of a focussing element 32 as comprising a movable lens, such as a plano-convex lens, in the path of transmission of the light beam from the first light source 16.

According to an embodiment, a user-actuatable beam size selector 22 capable of receiving a beam sizing command from the user, and controlling the focussing element 32 to provide the beam size selected by the user, wherein the focussing element 32 is actuated via a mechanical linkage to the beam size selector. In examples, focussing is performed by an electronically-actuated member via the controller 18.

The focussing element 32 is responsible for changing the effective nib size of the writing implement 10. The focussing element 32 may, for example, comprise an assembly of one or more movable lenses that accept the light from the first light source 16 and manipulate it in such a way as to change its focus point, effectively changing the nib size. For example, an unfocussed light beam may simulate a large nib size (greater than 2 mm, up to 10 mm in diameter). An in-focus light beam may replicate a fine nib size (for example, having a diameter of 0.5 mm). This focussing element may be electronically actuated via the beam size selector 22 and the controller 18.

The plano-convex lens illustrated in FIG. 3a may be adjusted along the longitudinal axis 52 of the writing implement 10 using a rack and pinion mechanism (not illustrated), or at least one stepping motor or linear motor controlled by the controller 18, for example.

The beam size selector 22 may be a mechanism operably coupled to the focussing element 32 and capable of, for example, adjusting the position of a lens within the focussing element 32 based on a rotary or sliding movement of such a mechanical beam size selector 22.

However, other focussing modalities may be applied. For example, the focussing element 32 may comprise at least one electro fluidic lens. An electro fluidic lens contains a focussing liquid and can change its shape, and thus focussing characteristic, based on an applied electrostatic field, for example.

In an example, the beam size selector 22 is a mechanical selection wheel disposed on the elongate body portion 12 of the writing implement 10. For example, the mechanical selection wheel may be mechanically coupled to a lens of the focussing element 32 and be configured to directly change the distance between at least one movable lens and the first light source 16.

In an example, the beam size selector 22 may be a sliding selector having a similar function to the mechanical selection wheel disposed on the side of the elongate body portion 12 of the writing implement 10, coupled to the focussing element 32 via a mechanism.

In an example, beam size selector 22 may be one, or more, selection buttons for incrementing through the available nib size options. A single button may be provided on the elongate body portion 12 to cycle through the available nib sizes.

In an example, beam size selector 22 may be a menu option on a smartphone application, configured to address the controller 18 via the first modem 28.

Of course, a skilled person appreciates that the eventual nib size also depends on contextual factors such as how far away the substrate 52 is held from the protruding optical nib portion 42, or the proximal end P of the writing implement 10. Appropriate instructions can be provided to a user of the writing implement to ensure that the nib resizing options can be used. For example, the writing implement 10 may be provided with instructions stating that an optimal separation between the proximal end P of the writing implement 10 and a substrate 52 is a given distance, such as 5 mm. In examples, the default separation distance between the proximal end P of the writing implement 10 and a substrate 52 may be a pre-settable menu option of a smartphone configuration application, for example.

According to an embodiment, the focussing element 32 comprises one or more movable lenses 34 aligned on an optical axis between the first light source 16 and the optical coupler. In an example, a beam sizing element comprises an iris.

An iris comprises a plurality of planar leaves such that as a rotary motion of the leaves is performed relative to a longitudinal axis of the writing implement 10, each leaf progressively intersects the beam from the first light source 16 to a greater extent, thus providing another option to control the nib size.

According to an embodiment, the writing implement 10 does not comprise a focussing element 32 and a beam size selector 22.

According to an embodiment the writing implement 10 further comprises a second light source 24 capable of generating light in a further spectrum at least partially corresponding to activation spectra of at least the first and/or second photochromic materials, wherein the second light source generates light having a wavelength in the range of 315-400 nm, or specifically 345 nm.

The second light source 24 may be considered to be the erasing mechanism of the stylus 10. Its inclusion in the writing implement 10 is not essential, because a separate erasing modality using light having a wavelength in the range of 315-400 nm, or specifically 345 nm may be provided using a separate device, such as a stand-alone eraser wand emitting light having a wavelength in the range of 315-400 nm, or specifically 345 nm.

In an example, the second light source 24 is configured to provide activation light to at least one photochromic material comprised on a substrate 52, an in examples, to two, three, or more photochromic materials.

In an example, the second light source 24 is configured to emit ultraviolet, or near ultraviolet, light.

In this embodiment, the second light source 24 may be integral to the writing implement 10. In an example, the second light source 24 is provided at or substantially proximate to the distal end of the writing implement 10, performing an analogous function to a conventional pencil-mounted rubber eraser. In an example, the second light source 24 is provided as a substantially linear element along a length of the elongated body portion 12. In an example, the second light source 24 is provided as a substantially linear element extending 25% of the total length of the elongated body portion 12. In an example, the second light source 24 is provided as a substantially linear element extending 50% of the total length of the elongated body portion 12. In an example, the second light source 24 is provided as a substantially linear element extending 75% of the total length of the elongated body portion 12. For example, the substantially linear element may be a leaky optical bar or leaky optical fibre enabling the propagation of the light from the second light source 24 to a large surface area of the substrate 52 to enable fast application of activation light from the second light source 24 to large areas of the substrate 52.

As illustrated in FIG. 3a, the second light source 24 is provided as a light source at the distal end D of the elongate body portion 12. In an example, the second light source 24 may be an illuminated switch that is activated and deactivated (toggled) as the switch is pressed, and recoils, in the direction of the longitudinal axis L of the writing implement 10.

According to an embodiment, the second light source 24 is provided at the distal end of the writing implement 10.

In an embodiment, either a proximity sensor, and/or an accelerometer comprised within the writing implement 10, is configured to detect the translation of the writing implement 10 between a first state where the first light source 16 is proximate (in optical contact) with the substrate 52, to a second state where the second light source 24 is in proximate (in optical contact) with the substrate 52, and vice versa. When transitioning into the first state, the second light source 24 is automatically deactivated by the controller 18. When transitioning into the second state, the first light source is automatically deactivated by the controller 18.

In another example (not illustrated), the second light source 24 is co-located with the first light source 16 inside the elongate body 12, and may use the same optical transmission path to the substrate 52 as the first light source 16. This enables finer erase precision, for example. In an example, the second light source 24 may be controlled using the colour selector 20, for example as the extreme or boundary setting of the colour selector 20.

In an example, the second light source 24 generates light in the activation wavelength of at least one, and specifically all, of the photochromic materials (dyes) used in the substrate 52. In an example, the second light source 24 is configured to generate UV light in the wavelength range 100-400 nm. In an example, the second light source 24 is configured to generate UV-A light in the wavelength range 315 nm-400 nm, specifically 345 nm. The second light source 24 is, in an example, capable of increasing or decreasing its intensity based on, for example, a command from the controller.

According to an embodiment, the first 16 and/or second 24 light sources is/are configured to automatically deactivate when not proximate to the substrate 52.

For example, the first 16 and/or second 24 light sources are provided with a proximity detector. The controller 18 monitors whether, or not, the first 16 and/or second 24 light sources satisfy a proximity criterion to a substrate 52. If the first 16 and/or second 24 light sources do not satisfy a proximity criterion to a substrate 52, this implies that the first 16 and/or second 24 light sources may be pointing towards the eye of a user, or another person. If the proximity criterion is not met, the controller 18 may, for example, deactivate, or reduce in intensity, the intensity of the electromagnetic radiation emitted from the first 16 and/or second 24 light sources.

In an example, the proximity detector may comprise a reciprocating or sprung mechanical switch fitted to the second 24 light source or, for example, the protruding optical nib portion 42, if present. In one example where the second 24 light source is provided at the distal end of the writing implement 10, if the distal end of the writing implement 10 is not in contact with a surface, then the mechanical switch is not activated, and the controller 18 does not illuminate the second light source 24 for safety reasons. An analogous arrangement can be provided for the first light source 16, actuatable via a mechanical switch in contact with the protruding optical nib portion 42, for example.

The proximity detector may be provided as a photodiode, phototransistor, light dependent resistor, or other electronic actuator capable of sensing the proximity of the first 16 and/or second 24 light sources to the substrate 52, for example. The proximity detector may be a time of flight sensor provided at the distal and/or proximal end of the writing implement 10, for example.

According to an embodiment, a portion of an optical coupler 42 protrudes from the proximal end of the writing implement 10, and comprises a hardened, transparent material capable, in use, of providing haptic feedback to a user of the writing implement 10 when the protruding portion of the writing implement 10 is in contact with a substrate of a writing tablet.

Accordingly, the protruding portion of the optical nib 42 functions as a transparent nib of the writing implement 10. The transparent nib comes into direct contact with the substrate 52, for example. This provides haptic feedback to a user of the writing implement 10 enabling the feeling of writing on a surface to be emulated. The protruding portion of the optical nib 42 may enable the spacing of the writing implement 10 from the substrate 52 to be predictably regulated, to ensure even sizing of the optical nib, for example.

According to an embodiment, the first light source is fixed at the proximal end P of the writing implement 10, so that the light source functions as a nib that may contact a writing medium. For example, a single-colour or multi-colour LED may be mounted at the proximal end P of the writing implement 10. In this case, an optical coupler and/or a focussing element are not required.

The protruding portion of the optical nib 42 may be integrally formed with optical coupler 14, and thus be formed from optical glass, plastic, or an encapsulated gel, for example.

In another example, a protruding portion of the optical nib 42 is not present. For example, the writing implement 10 could be provided with instructions detailing that it should be held within a range of distances form a substrate 52 to ensure a correctly sized optical nib. In another example, the optical nib diameter may be fixed (and thus, the focussing element 34 may be non-adjustable). In this case, the size of the optical nib is varied by moving the writing implement 10 closer to, or further away from, the substrate 52.

According to an embodiment, the writing implement 10 further comprises a first modem 28, configured to enable the controller to communicate with an external communications node, or a second modem comprised within a writing medium 50. For example, the wired modem may be a USB™ modem. For example, the wireless modem may be one of a WiFi™ compatible modem, a Bluetooth™ compatible modem, a Near-Field communications (NFC) modem, or a ZigBee™ Modem.

According to an embodiment, the controller 18 is configured to interrogate, via the first modem 28, an electronic subsystem of a writing medium 50 comprising a substrate 52, and to receive from the electronic subsystem of the writing medium 50 designation data describing at least a first and a second photochromic material comprised within the substrate of the writing medium 50. The controller 18 is configured to compute the required setting for the one or more of the first and second colour components of the first light source based on the received writing medium designation data.

In an embodiment, a smartphone, tablet, or personal computer comprises an application capable of communicating with the writing implement 10 via a first modem 28 of the writing implement 10. The application is capable of controlling the functionality of the writing implement 10, such as the colour selection, beam size, and the like. In examples, the writing implement 10 does not require a colour selector 20 and/or a beam size selector 22, because the writing implement 10 is programmed with the colour and beam size setting via the application. In a further example, the application is configured to perform the colour setting computation and to communicate the output intensity values or sequence display information of the first light source 16 via the first modem 28.

According to a second aspect, there is provided a method 70 for using a writing implement 10 configured to emit light to alter the appearance of a substrate comprising at least one photochromic material, comprising:

receiving 72, from a user-actuatable colour selector of the writing implement, a colour setting command from a user of the writing implement;

providing 74 the colour setting command to a controller of the writing implement;

computing 76 a required setting for at least a first colour component to be emitted by the first light source of the writing implement;

controlling 78 the first light source to emit light comprising at least the computed first colour component, wherein the first colour component is within a first wavelength range, that at least partially corresponds to a deactivation spectrum of a first photochromic material of a substrate 52 of a proximate writing medium 50; and disposing 80 the proximal end of the writing implement relative to the proximate writing medium 50 to expose the substrate of the proximate writing medium 50 comprising at least the first photochromic material to the light generated by the first light source.

FIG. 5 schematically illustrates a method 70 according to the second aspect.

FIG. 6 schematically illustrates an example method 81.

In a first step 82 of the example method 81, the user activates the writing implement 10 by turning the device on, for example by using a dedicated power switch (not illustrated) or by using one of the colour selector 20 or the beam size selector 22 (if present) as a surrogate power switch.

A desired colour may be selected 83 by the user via the colour selector 20. For example, a user can rotate a colour selection wheel until a desired colour is displayed on a colour selection display of the writing implement 10, or a connected smartphone or tablet application. It is assumed that the substrate 52 of the writing medium 50 has previously been partially, or fully, activated using UV or UV-A light.

A user may adjust the nib size 84 using the beam size selector 22. For example, the user may adjust a nib size selection wheel or slider located on the elongate body portion of the writing implement 10.

Having made the selection, the colour setting computation 106 is performed 85 and the first light source 16 is set to emit the computed colour.

The user then initiates 86 writing on the substrate 52 of the writing medium 50. The application of the selected deactivation colour to the substrate 52 enables a sketch or writing to be displayed on the substrate 52 of the writing medium 50.

A user may, in examples, decide to erase a portion of the substrate 52. Therefore, the second light source 24 may in circumstances be activated 87 by the user. For example, the user can flip the writing implement 10 over to provide the distal end of the writing implement 10 in proximity (optical contact) to the substrate 52. When the second light source 24 is proximate to the substrate 52, the at least one photochromic material comprised in the substrate 52 is deactivated at the portion of the substrate 52 in optical contact with the second light source 24. A user may in circumstances decide to reset 88 (activate) the entire substrate 52, for example, by exposing the substrate 52 to a UV or UV-A wand or light source, or in examples, by leaving it in direct sunlight for a predefined time period.

Further steps of the method may comprise:
initializing a management application for the writing implement 10 on a personal computing device or a smartphone;
establishing a data communication connection between the personal computing device or the smartphone and the controller 18 of the writing implement 10;
selecting, via the management application, one or more parameters including: a desired writing colour of the writing implement 10, the beam size, and "on" or "off" state of the second light source 24, power management features of the writing implement, or a photochromic material configuration of a user-chosen writing medium 50, and
transmitting the one or more parameters to the controller of the writing implement, and configuring the writing implement based on the transmitted parameters.

Accordingly, many physical interface features of a writing implement 10 may be omitted, such as a colour selector 20 and a beam size selector 22, when the writing implement 10 is controlled via a smartphone, tablet, or personal computing application. This can simplify the design of the stylus itself.

According to a third aspect, there is provided a photochromic writing system 90 comprising a writing implement 10 according to the first aspect or its embodiments, and a writing medium 50 comprising a substrate 52 containing at least one photochromic material.

The writing implement 10 is configured, in use, to emit, from the proximal end P, light in the visible spectrum capable of deactivating the at least one photochromic material comprised in the substrate 52 of the writing medium 50 to thus change the appearance of a portion of the writing medium 50.

The substrate 52 of the photochromic writing system 90 may be chosen to comprise at least one photochromic material having a maximum deactivation wavelength in a range of wavelengths matched to the first light source 16 of the writing implement 10.

For example, the substrate 52 may comprise one photochromic material.

In a case where the substrate 52 comprises one photochromic material, the maximum of the deactivation spectrum of the one photochromic material is within one of the wavelength ranges 400 nm-425 nm, 425 nm-475 nm, 475 nm-525 nm, 525 nm-560 nm, 560 nm-590 nm, 590 nm-625 nm, and 625 nm-700 nm.

For example, the substrate 52 may comprise a combination of at least first and second photochromic materials having the following deactivation wavelength maxima as defined by any combination of ranges from the first and second columns of Table 1:

TABLE 1

| Maximum of the deactivation spectrum of first photochromic material in wavelength range: | Maximum of the deactivation spectrum of second photochromic material in wavelength range: |
| --- | --- |
| 400 nm-425 nm | One range selected from: 425 nm-475 nm, 475 nm-525 nm, 525 nm-560 nm, 560 nm-590 nm, 590 nm-625 nm, and 625 nm-700 nm |
| 425 nm-475 nm | One range selected from: 400 nm-425 nm, 475 nm-525 nm, 525 nm-560 nm, 560 nm-590 nm, 590 nm-625 nm, and 625 nm-700 nm |
| 475 nm-525 nm | One range selected from: 400 nm-425 nm, 425 nm-475 nm, 525 nm-560 nm, 560 nm-590 nm, 590 nm-625 nm, and 625 nm-700 nm |
| 560 nm-590 nm | One range selected from: 400 nm-425 nm, 425 nm-475 nm, 475 nm-525 nm, 525 nm-560 nm, 590 nm-625 nm, and 625 nm-700 nm |
| 590 nm-625 nm | One range selected from: 400 nm-425 nm, 425 nm-475 nm, 475 nm-525 nm, 525 nm-560 nm, 560 nm-590 nm, and 625 nm-700 nm |

TABLE 1-continued

| Maximum of the deactivation spectrum of first photochromic material in wavelength range: | Maximum of the deactivation spectrum of second photochromic material in wavelength range: |
| --- | --- |
| 625 nm-700 nm | One range selected from: 400 nm-425 nm, 425 nm-475 nm, 475 nm-525 nm, 525 nm-560 nm, 560 nm-590 nm, and 590 nm-625 nm. |

The substrate 52 of the photochromic writing system 90 may comprise three photochromic materials. In this case, the first light source 16 of the writing implement 10 (optical stylus, light emitting stylus) is capable of generating light at three spectral maxima corresponding to the three deactivation wavelengths (or wavelength ranges) of the three photochromic materials.

For example, the photochromic substrate layer 52 may comprise a mixture of Yamada DAE-0001 (blue), DAE-0012 (magenta), and DAE-0068 (yellow) to obtain a CMY colour space. In another example, photochromic substrate layer 52 comprise a mixture of Yamada DAE-0001 (blue), DAE-0004 (red), and DAE-0068 (yellow) available from Yamada Chemical Co., Ltd. A skilled person will appreciate that a wide range of photochromic materials may be applied, dependent on the intended end colour specification.

In an embodiment, the writing medium 50 comprises an electronics subsystem 56. The electronics subsystem 56 may comprise a memory configured to store identifiers, or spectral data, of the at least one photochromic material comprised in the substrate 52 of the writing medium 50. The writing implement 10 is, in an embodiment, configured to interrogate the electronic subsystem (for example, via the second modem) to obtain the identifiers, or spectral data, of the at least one photochromic material comprised in the substrate 52 of the writing medium 50. The controller 18 of the writing implement 10, and/or a remote application on a smartphone, tablet, or a personal computer, may use the identifiers, or spectral data, of the at least one photochromic material comprised in the substrate 52 of the writing medium 50 to compute intensity values of the first light source 16 required to obtain one or more desired colours defined by a colour selector 20 of the writing implement 10.

Figure 7:
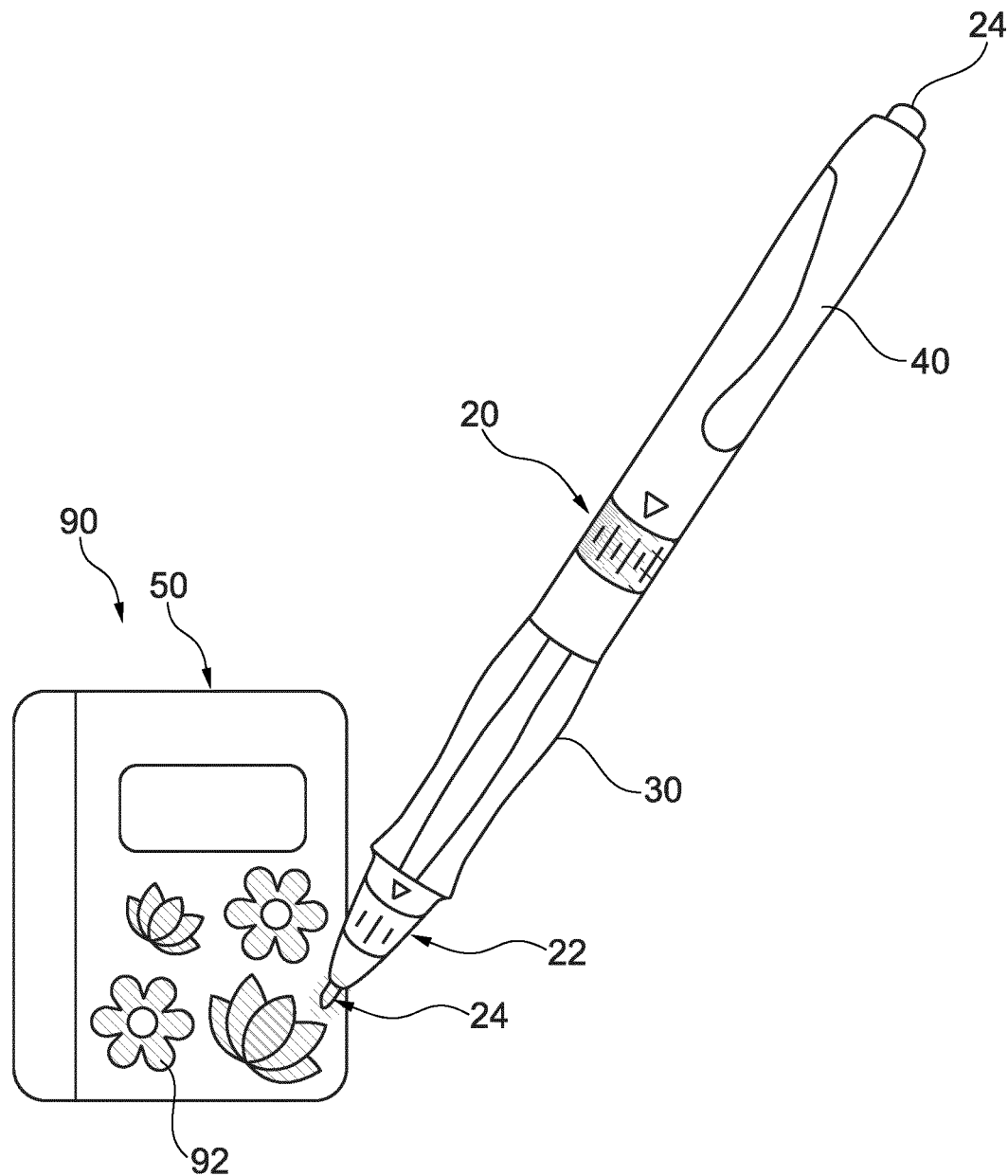
FIG. 7 schematically illustrates a writing implement writing on a photochromic writing system.

FIG. 7 schematically illustrates a photochromic writing system 90 comprising a writing implement 10 writing on a photochromic writing medium 50.

Figure 8:
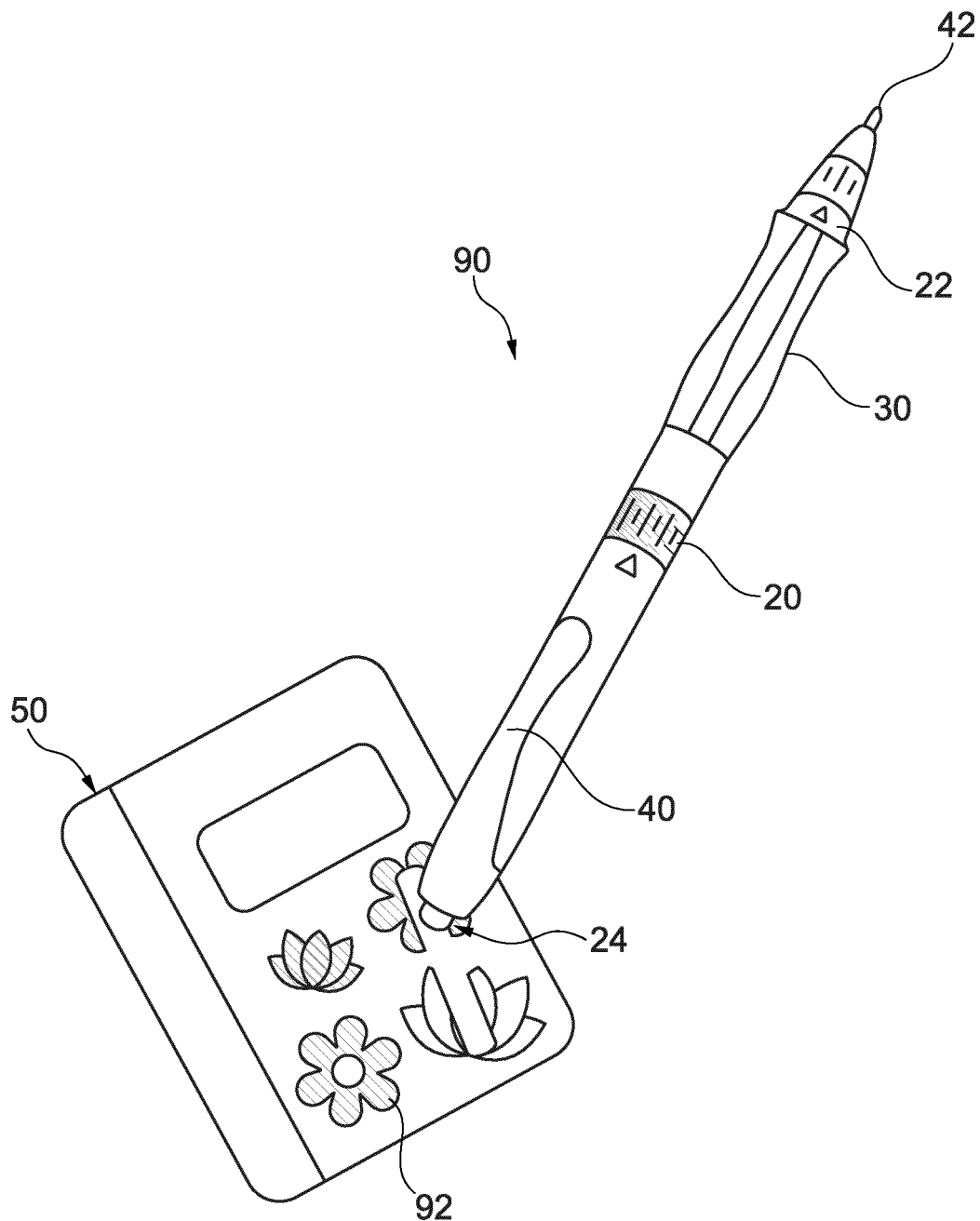
FIG. 8 schematically illustrates a writing implement being used to erase writing applied to a photochromic writing system.

FIG. 8 schematically illustrates a photochromic writing system 90 comprising a writing implement 10 being used to erase writing applied to a photochromic writing medium 50 using a second light source 24 of the writing implement 10.

According to an embodiment of the third aspect, the photochromic writing system 90 further comprises a personal computing device or a smartphone. The personal computing device or smartphone is configured to initialize a management application for the writing implement 10, to establish a data communication connection between the personal computing device or the smartphone and the controller of the writing implement 10, and to select, via the management application, one or more parameters including: a desired writing colour of the writing implement 10, the beam size, and "on" or "off" state of the second light source, power management features of the writing implement 10, or a material configuration of a user-chosen writing medium 50. The personal computing device or a smartphone is configured to transmit the one or more parameters to the controller of the writing implement 10, and the controller is configured to update the writing implement 10 based on the transmitted parameters.

According to a fourth aspect there is provided a computer program element comprising machine-executable instructions which, when executed on a computer processor, cause the processor to perform the steps according to the method of the second aspect.

According to a fifth aspect, there is provided a computer readable medium comprising the computer program element of the fourth aspect.

According to a further aspect, there is provided a writing implement 10 configured to emit light for altering the appearance of a substrate comprising at least one photochromic material, wherein the writing implement 10 further comprises:

an elongate body portion 12 enabling a user to grip the writing implement 10, wherein the body portion comprises a proximal end P and a distal end D; and a first light source 16 configured to emit light from the proximal end, wherein the light comprises at least a first colour component within a first wavelength range 65, wherein the first colour component is capable of being emitted in a predefined alternating sequence, and wherein the first wavelength range at least partially corresponds to a deactivation spectrum of a first photochromic material 62Y, and a controller 18 configured to receive input from a user, and to generate signals for controlling the first light source based on the received user input.

Accordingly, it is possible to provide a writing implement 10 comprising a single colour light emitting source, thus eliminating the need for a colour selector and/or a controller 18 configured to computer a colour setting. According to this aspect, a monochromatic writing medium would be available.

According to a further aspect, there is provided a writing medium 50 comprising a substrate 52 containing at least one photochromic material, and an electronics subsystem 56. The electronics subsystem 56 may comprise a memory configured to store identifiers, or spectral data, of the at least one photochromic material comprised in the substrate 52 of the writing medium 50. In an example, the writing medium 50 comprises a second modem, and the second modem is configured, upon interrogation by a writing implement 10, to interrogate the electronics subsystem 56 to obtain the identifiers, or spectral data, of the at least one photochromic material comprised in the substrate 52 of the writing medium 50.

References throughout the preceding specification to "one embodiment", "an embodiment", "one example" or "an example", "one aspect" or "an aspect" means that a particular feature, structure, or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Furthermore, the particular features, structures, or characteristics may be combined in any suitable combinations and/or sub-combinations in one or more embodiments or examples.

It should be understood that the present disclosure can also be defined in accordance with the following embodiments:

| REFERENCE NUMERALS | | | |
|---|---|---|---|
| P | Proximal End | 60 | Exemplary Activation/ |
| D | Distal End | | Deactivation Spectrum |
| 10 | Writing implement | 62 | Deactivation Spectra of Dye |
| 12 | Elongate body portion | 64 | Activation Spectra of Dye |
| 12a | Main body portion | 66 | Light Source Spectra |
| 12b | Tapering body portion | 70 | Method for using a Writing |
| 12c | Optical nib portion | | implement |
| 14 | Optical Coupler | 72 | Receiving . . . |
| 16 | First Light Source | 74 | Providing . . . |
| 18 | Controller | 76 | Computing . . . |
| 20 | Colour Selector | 78 | Controlling . . . |
| 22 | Beam Size Selector | 80 | Disposing . . . |
| 24 | Second Light Source | 90 | Photochromic Writing System |
| 26 | Power Source | 100 | Colour Control Instructions |
| 28 | First Modem | 102 | Input Colour Setting |
| 30 | User Grip | 104 | Writing Medium Parameters |
| 32 | Focussing Element | 106 | Colour Setting Computation |
| 34 | Lens | 108 | Output Intensity Values and/or |
| 36 | Lens Motion Axis | | Sequence Information of |
| | | | Light Source |
| 38 | Camera | 110 | Setting the First Light Source |
| 40 | Clip | 112 | Monitoring the Colour of the |
| 42 | Protruding optical nib | | Writing Medium |
| | portion of Optical Coupler | 114 | Detecting a Divergence and |
| 50 | Writing Medium | | Recomputing the Output |
| 52 | Photochromic Substrate | | Intensity Values and/or |
| | Layer | | Sequence Information |
| 54 | Backing Layer | | of the Light Source |
| 56 | Electronics subsystem | 116 | Mobile Phone Application |
| | | L | Longitudinal Axis |

The invention claimed is:

1. A writing implement configured to emit light for altering the appearance of a substrate comprising at least one photochromic material, wherein the writing implement comprises:
    an elongate body portion enabling a user to grip the writing implement, wherein the body portion comprises a proximal end and a distal end;
    a first light source configured to emit light from the proximal end, wherein the emitted light comprises at least a first colour component within a first wavelength range, wherein the first wavelength range comprises a spectral maximum within one of the ranges: 400 nm-425 nm, 425 nm-475 nm, 475 nm-525 nm, 525 nm-560 nm, 560 nm-590 nm, 590 nm-625 nm, or 625 nm-700 nm;
    a controller configured to receive input from a user, and to generate signals for controlling the first light source based on the received user input;
    a user-actuatable colour selector configured to receive a colour setting command from a user of the writing implement, and to provide the colour setting command to the controller; and
    a first modem, configured to enable the controller to communicate with a second modem,
    wherein the controller is configured to interrogate, via the first modem, to an electronic subsystem of a writing medium comprising a substrate, and to receive from the electronic subsystem of the writing medium designation data describing at least a first photochromic material comprised within the substrate of the writing medium, and
    wherein the controller is configured to compute the required intensity setting for at least the first colour component emitted by the first light source based on the received writing medium designation data.

2. The writing implement according to claim 1, wherein the first light source is additionally configured to emit light comprising a second colour component within a second wavelength range, wherein the second wavelength range at least partially corresponds to a deactivation spectrum of a second photochromic material of the substrate, and wherein the first and second colour components are capable of being emitted from the first light source (i) individually, (ii) simultaneously, or (iii) in a predefined alternating sequence.

3. The writing implement according to claim 1, wherein the second wavelength range comprises a spectral maximum within one of the ranges: 400 nm-425 nm, 425 nm-475 nm, 475 nm-525 nm, 525 nm-560 nm, 560 nm-590 nm, 590 nm-625 nm, or 625 nm-700 nm.

4. The writing implement according to claim 1, wherein the first light source is selected from the group of: a light emitting diode configured to emit light in at least the first wavelength range, an adjustable variable colour LED, one or more laser light sources, or one or more polychromatic LEDs comprising corresponding filtering elements in at least the first wavelength range.

5. The writing implement according to claim 1, wherein the controller is configured to receive the colour setting command from the user-actuatable colour selector, to compute a required intensity setting at least the first colour component of the first light source enabling a desired colour to be displayed on a substrate comprising at least one photochromic material, and to control the first light source to emit light comprising at least the computed first colour component at the computed intensity.

6. The writing implement according to claim 1, wherein the writing implement further comprises a focussing element configured to adjust an extent of an illuminated region on a surface of a facing substrate by adjusting a beam size of a beam from the first light source.

7. The writing implement according to claim 6, further comprising:
    a user-actuatable beam size selector capable of receiving a beam sizing command from the user, wherein the beam size selector is configured to control the focussing element to provide the beam size selected by the user, wherein the focussing element is actuated via a mechanical linkage to the beam size selector, or via an electronic actuation member controlled by the controller.

8. The writing implement according to claim 1, further comprising:
    a second light source capable of generating light in a further spectrum at least partially corresponding to activation spectra of at least the first photochromic material, wherein the second light source generates light having a component in the wavelength range of 315-400 nm.

9. The writing implement according to claim 8, wherein the second light source is configured to automatically deactivate when not in contact with the substrate.

10. The writing implement according to claim 1, further comprising:
a camera for providing feedback to the controller of a colour of a substrate obtained whilst operating the writing implement in combination with a specific combination of photochromic materials.

11. The writing implement according to claim 1, further comprising:
a wireless or wired communications modem, configured to enable the controller to communicate with an external communications node.

12. The writing implement according to claim 11, wherein the controller is configured to interrogate, via the wireless or wired communications modem, an electronic subsystem of a writing surface comprising a substrate, and to receive from the electronic subsystem of the writing surface designation data describing at least a first and a second photochromic dye comprised within the substrate of the writing surface, and wherein the controller is configured to compute the required setting for the one or more of the first and second colour components of the first light source based on the received writing surface designation data.

13. A method for using a writing implement configured to emit light to alter the appearance of a substrate comprising at least one photochromic material, comprising:
receiving, from a user-actuatable colour selector of the writing implement, a colour setting command from a user of the writing implement;
providing the colour setting command to a controller of the writing implement;
computing a required setting for at least a first colour component to be emitted by the first light source of the writing implement;
controlling the first light source to emit light comprising at least the computed first colour component, wherein the first colour component is within a first wavelength range, that at least partially corresponds to a deactivation spectrum of a first photochromic material of a substrate of a proximate writing medium;
disposing the proximal end of the writing implement relative to the proximate writing medium to expose the substrate of the proximate writing medium comprising at least the first photochromic material to the light generated by the first light source;
communicating, via controller, with a second modem through a first modem; and
interrogating, via the first modem, to an electronic subsystem of a writing medium comprising a substrate, and to receive from the electronic subsystem of the writing medium designation data describing at least a first photochromic material comprised within the substrate of the writing medium, and wherein the controller is configured to compute the required intensity setting for at least the first colour component emitted by the first light source based on the received writing medium designation data.

14. The method for using a writing implement according to claim 13, further comprising:
initializing a management application for the writing implement on a personal computing device or a smartphone;
establishing a data communication connection between the personal computing device or the smartphone and the controller of the writing implement;
selecting, via the management application, one or more parameters including: a desired writing colour of the writing implement, the beam size, and "on" or "off" state of the second light source, power management features of the writing implement, or a dye configuration of a user-chosen writing medium;
transmitting the one or more parameters to the controller of the writing implement, and configuring the writing implement based on the transmitted parameters.

15. A photochromic writing system comprising:
a writing implement according to claim 1; and
a writing medium comprising a substrate containing at least one photochromic material;
wherein the writing implement is configured, in use, to emit, from its proximal end, light in the visible spectrum capable of deactivating the at least one photochromic material comprised in the substrate of the writing medium to thus change the appearance of a portion of the writing medium.

16. The photochromic writing system according to claim 15, wherein the first wavelength range at least partially corresponds to a deactivation spectrum of the first photochromic material of the substrate.

17. The photochromic writing system according to claim 15, further comprising:
a personal computing device or a smartphone;
wherein the personal computing device or a smartphone are configured to initialize a management application for the writing implement, to establish a data communication connection between the personal computing device or the smartphone and the controller of the writing implement, and to select, via the management application, one or more parameters including: a desired writing colour of the writing implement, the beam size, and "on" or "off" state of the second light source, power management features of the writing implement, or a dye configuration of a user-chosen writing surface, and wherein the personal computing device or a smartphone is configured to transmit the one or more parameters to the controller of the writing implement, and the controller is configured to update the writing implement based on the transmitted parameters.

18. A non-transitory computer readable medium comprising machine-executable instructions which, when executed on a computer processor, cause the processor to perform the steps of claim 11.

* * * * *